US008549090B2

(12) United States Patent
Gotlieb et al.

(10) Patent No.: US 8,549,090 B2
(45) Date of Patent: Oct. 1, 2013

(54) MESSAGING TRACKING SYSTEM AND METHOD

(75) Inventors: Adam B. Gotlieb, Parker, CO (US); Joseph F. Klingensmith, Colorado Springs, CO (US); Kavitha Guda, Greenwood Village, CO (US); Ryan P. Mocko, Colorado Springs, CO (US); Fee Ling Chin, Lafayette, CO (US)

(73) Assignee: HBC Solutions, Inc., Englewood, CO (US)

( * ) Notice: Subject to any disclaimer, the term of this patent is extended or adjusted under 35 U.S.C. 154(b) by 793 days.

(21) Appl. No.: 12/190,847

(22) Filed: Aug. 13, 2008

(65) Prior Publication Data

US 2010/0042633 A1 Feb. 18, 2010

(51) Int. Cl.

| | |
|---|---|
| ***G06F 15/16*** | (2006.01) |
| *G06F 15/173* | (2006.01) |
| *H04M 3/493* | (2006.01) |

(52) U.S. Cl.

USPC ........... 709/207; 709/224; 709/228; 709/246; 455/414.2

(58) Field of Classification Search

USPC .................................................. 709/205–209

See application file for complete search history.

(56) References Cited

U.S. PATENT DOCUMENTS

| | | | | |
|---|---|---|---|---|
| 5,517,622 | A | 5/1996 | Ivanoff et al. | |
| 6,278,965 | B1 * | 8/2001 | Glass et al. | 703/22 |
| 6,760,911 | B1 | 7/2004 | Ye | |
| 7,143,392 | B2 | 11/2006 | li et al. | |
| 2002/0087704 | A1 * | 7/2002 | Chesnais et al. | 709/228 |
| 2002/0138605 | A1 * | 9/2002 | Hole | 709/224 |
| 2005/0050540 | A1 | 3/2005 | Shaughnessy et al. | |
| 2005/0141706 | A1 | 6/2005 | Regli et al. | |
| 2005/0262515 | A1 | 11/2005 | Dinh et al. | |
| 2006/0133422 | A1 | 6/2006 | Maughan et al. | |
| 2006/0206903 | A1 | 9/2006 | Lawrence et al. | |
| 2009/0275314 | A1 * | 11/2009 | Cotevino et al. | 455/414.2 |

OTHER PUBLICATIONS

Int'l Search Report—3 pgs, Jul. 6, 2010, Harris Corporation.

Written Opinion of the Int'l Search Report—4 pgs, Jul. 6, 2010, Harris Corporation.

* cited by examiner

*Primary Examiner* — Evans Desrosiers

(74) *Attorney, Agent, or Firm* — Tarolli, Sundheim, Covell & Tummino LLP

(57) ABSTRACT

One embodiment of the invention includes a message tracking system. The system comprises a message agent programmed to detect messages transmitted from one application to at least one other application. The system also comprises a detector programmed to determine a protocol that is associated with a given message of the messages detected by the message agent. The system further comprises a tracking manager programmed to generate tracking information for the given message based on the protocol determined by the detector and to store the tracking information in memory.

29 Claims, 8 Drawing Sheets

120

```
<ProtocolSettings xmlns="Harris/Media/Configuration/Protocol" xmlns:xsi="http://www.w3.org/
2001/XMLSchema-instance" xsi:schemaLocation="Harris/Media/Configuration/Protocol
Protocols.xsd">
 <Protocols>
  <Protocol name="BXF v1">
   <RootElement>BxfMessage</RootElement>
   <Namespace>http://smpte-ra.org/schemas/2021/2007/BXF</Namespace>
   <SchemaPath>SMPTE/BXF/v1/bxfschema.xsd</SchemaPath>
   <Prefix>bxf</Prefix>
   <ErrorXPath>boolean(bxf:BxfMessage[@status='error' or @status='invalid'])</ErrorXPath>
   <AnyElement>PrivateInformation</AnyElement>
   <AnyElement>BxfQueryResponse</AnyElement>
   <MessagePropertyLocation field="RootError">bxf:BxfMessage/@error</
MessagePropertyLocation>
   <MessagePropertyLocation field="MessageId">bxf:BxfMessage/@id</
MessagePropertyLocation>
   <MessagePropertyLocation field="ReferredMessageId">bxf:BxfMessage/
@originMessageId</MessagePropertyLocation>
   <MessagePropertyLocation field="Origin">bxf:BxfMessage/@origin</
MessagePropertyLocation>
     <MessagePropertyLocation field="Destination">bxf:BxfMessage/@destination</
MessagePropertyLocation>
   <MessagePropertyLocation field="CreateTime">bxf:BxfMessage/@dateTime</
MessagePropertyLocation>
  </Protocol>
  <Protocol name="BXF v1 (Extension)" internal="true">
   <RootElement>None</RootElement>
   <Namespace>Harris/Media/BXF-Extension/v1</Namespace>
   <SchemaPath>Harris/BXF-Extension/v1/bxfschema-extension.xsd</SchemaPath>
   <Prefix>bxfx</Prefix>
  </Protocol>
     •
     •
     •
 </Protocols>
</ProtocolSettings>
```

```
<?xml version="1.0" ?>
<MessageTypesSettings xmlns:xsi="http://www.w3.org/2001/XMLSchema-instance" xmlns:xsd="http://
www.w3.org/2001/XMLSchema">
  <MessageTypes>
    <MessageType>
      <Name>Ping Acknowledgement</Name>
      <Description>An acknowledgement of a H-Class ping message.</Description>
      <Category>Acknowledgement</Category>
132   <Direction>NotSet</Direction>
      <Group>Diagnostic</Group>
      <Role>Both</Role>
      <Active>true</Active>
    </MessageType>
    <MessageType>
      <Name>Playlist Query</Name>
      <Description>A query request for playlist information.</Description>
      <Category>Request</Category>
134   <Direction>ApplicationToApplication</Direction>
      <Group>Scheduling</Group>
      <Role>Both</Role>
      <Active>true</Active>
    </MessageType>
      •
      •
      •
    <MessageType>
      <Name>Media Query</Name>
      <Description>A query request for media information.</Description>
      <Category>Request</Category>
136   <Direction>ApplicationToPlatform</Direction>
      <Group>Content</Group>
      <Role>Both</Role>
      <Active>true</Active>
    </MessageType>
    <MessageType>
      <Name>Program Schedule</Name>
      <Description>A notification of program schedule changes, including adds, updates and
      removes.</Description>
      <Category>Information</Category>
138   <Direction>ApplicationToApplication</Direction>
      <Group>Scheduling</Group>
      <Role>Both</Role>
      <Active>true</Active>
    </MessageType>
    <MessageType>
      <Name>Content</Name>
      <Description>A notification of content changes, including adds, updates and removes.</
      Description>
140   <Category>Information</Category>
      <Direction>ApplicationToApplication</Direction>
      <Group>Content</Group>
      <Role>Both</Role>
      <Active>true</Active>
    </MessageType>
  </MessageTypes>
</MessageTypesSettings>
```

```
        <?xml version="1.0" encoding="utf-8" ?>
        <FlightPlans xmlns="Harris/Media/Configuration/Protocol" xmlns:xsi="http://www.w3.org/
        2001/XMLSchema-instance" xsi:schemaLocation="Harris/Media/Configuration/Protocol
        FlightPlan.xsd">

222       <FlightPlan Id="28">
224         <Protocol>BXF v1</Protocol>
226         <Direction>PlatformToApplication</Direction>
228         <Category>Request</Category>
             <SequenceSteps>
               <SequenceStep>
                 <SequenceId>28000</SequenceId>
                 <SequenceDescription>Request</SequenceDescription>
230              <PreviousSequenceId />
                 <MessageState>New</MessageState>
                 <ProcessingEntity>MessagingBusinessService</ProcessingEntity>
               </SequenceStep>
               <SequenceStep>
                 <SequenceId>28100</SequenceId>
                 <SequenceDescription>Request</SequenceDescription>
230              <PreviousSequenceId>28000</PreviousSequenceId>
                 <MessageState>Sent</MessageState>
                 <ProcessingEntity>ForwardingAgent</ProcessingEntity>
               </SequenceStep>
               <SequenceStep>
               <SequenceId>28200</SequenceId>
                 <SequenceDescription>Acknowledgement</SequenceDescription>
230              <PreviousSequenceId>28100</PreviousSequenceId>
                 <MessageState>Received</MessageState>
                 <ProcessingEntity>IncomingMessageHandler</ProcessingEntity>
               </SequenceStep>
               <SequenceStep>
                 <SequenceId>28300</SequenceId>
                 <SequenceDescription>Acknowledgement</SequenceDescription>
230              <PreviousSequenceId>28200</PreviousSequenceId>
                 <MessageState>Accepted</MessageState>
                 <ProcessingEntity>SystemMessageAgent</ProcessingEntity>
               </SequenceStep>
               <SequenceStep>
                 <SequenceId>28400</SequenceId>
                 <SequenceDescription>Reply</SequenceDescription>
230              <PreviousSequenceId>28300</PreviousSequenceId>
                 <MessageState>Replied</MessageState>
                 <ProcessingEntity>SystemMessageAgent</ProcessingEntity>
               </SequenceStep>
             </SequenceSteps>
          </FlightPlan>
```

FIG. 8

MESSAGING TRACKING SYSTEM AND METHOD

TECHNICAL FIELD

The present invention relates generally to communications and, more specifically, to a message tracking system and related method.

BACKGROUND

In an integrated network environment, software and hardware components can be configured to communicate information with each other. Such information can be sent in an asynchronous or synchronous manner, generally depending on the nature of the information. For instance, in the broadcast media as well as other industries, there tend to be many proprietary and custom interfaces in use to achieve interoperability between various business processes and operational systems that utilize different protocols in a given network environment. Each of the applications in an enterprise can employ a respective protocol for sending messages to one or more recipients. Thus, as existing standards evolve and as new standards emerge, the communication of messages between an increasing number of applications becomes more complex.

SUMMARY

The invention relates to a message tracking system or method.

One embodiment of the invention includes a message tracking system. The system comprises a message agent programmed to detect messages transmitted from one application to at least one other application. The system also comprises a detector programmed to determine a protocol that is associated with a given message of the messages detected by the message agent. A tracking manager is programmed to generate tracking information for the given message based on the protocol determined by the detector and to store the tracking information in memory.

Another embodiment of the invention includes a method for tracking messages. The method includes receiving a first message that has been published by a first application at a message tracking system. A protocol is determined according to which the first message is configured. Tracking information associated with the first message is generated based on the determined protocol and the tracking information is stored onto a computer readable medium. At least one related message is received at the message tracking system, which message is responsive to the first message. The tracking information is updated based on the at least one related message.

Another embodiment of the invention relates to a system that includes a publishing application programmed to publish messages within a network. At least one subscribing application is configured to subscribe to the messages from the network. A detector is programmed to determine a protocol associated with a given one of the messages. A tracking manager is programmed to generate tracking information for the given one of the messages based on the determined protocol. A graphical user interface (GUI) provides user access to the tracking information.

BRIEF DESCRIPTION OF THE DRAWINGS

FIG. 4 illustrates an example a protocol registrar that can be implemented in accordance with an aspect of the invention.

FIG. 5 illustrates an example of a message category registrar that can be implemented in accordance with an aspect of the invention.

FIG. 8 illustrates another example of a flight plan that can be implemented in accordance with an aspect of the invention.

DETAILED DESCRIPTION

Figure 1:
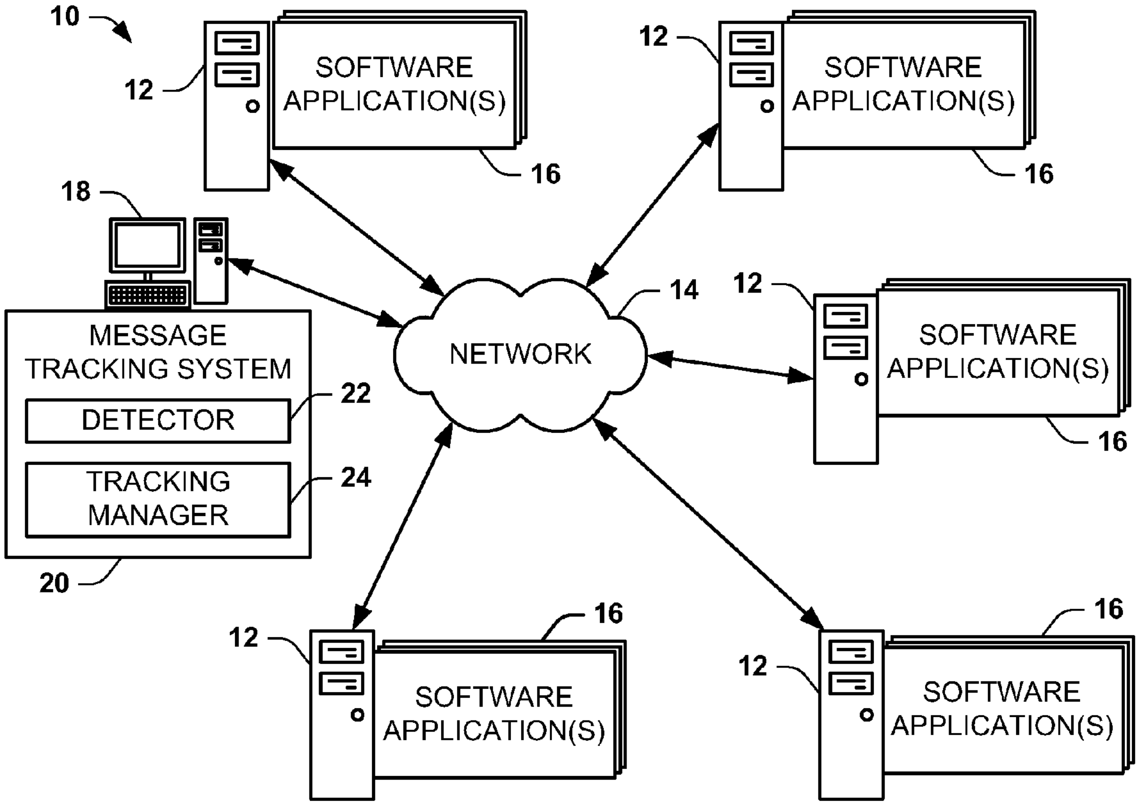
FIG. 1 illustrates an example of a network system in accordance with an aspect of the invention.

The present invention relates generally to communications and, more specifically, to a message tracking system and a related method. In a network (e.g., an enterprise network), software applications publish messages onto the network, such as in an asynchronous manner. Additional software applications can subscribe to and receive certain of the messages via the network. The particular types of messages and content of such messages will depend on the particular application sending the messages and the protocol according to which the message is provided. The subscribing applications can also send responses (e.g., replies or acknowledgements) to messages that they receive. The messages can be provided to any of a plurality of protocols, which protocols can include any proprietary or publicly available standards. As new systems and applications are developed, the protocols utilized also tend to evolve and new protocols are developed. This is true with the media broadcast industry as well as with other industries.

According to an aspect of the invention, a message tracking system can be programmed to receive messages that are published on the network by any number of one or more applications. The message tracking system can be programmed to generate tracking information associated with the published messages, which tracking information can be accessible by a user, such as for planning, workflow updates, and/or troubleshooting purposes. The tracking information for each of the messages can be provided as a flight plan that includes elements that represent a complete message lifecycle (or message transaction) between two or more of the plurality of software applications. The message tracking system can be configured to generate such tracking information for each of the messages, regardless of the protocol in which each of the messages are configured. For instance, the message tracking system can include a registrar that stores one or more configuration files that include query statements for processing messages provided according to each of any number of one or more protocols. The configuration file(s) enable the tracking system to gather information that is used to generate and update the tracking information for a respective flight plan. The configuration file(s) is expandable such that it will be appreciated that no custom and/or protocol-specific tracking software is required and no modifications to the core tracking system are required to accommodate each of the protocols that might be utilized. The message tracking system thus can be considered to operate in a protocol agnostic manner.

As will be appreciated by those skilled in the art, portions of the invention may be embodied as a method, data processing system, or computer program product. Accordingly, these portions of the present invention may take the form of an entirely hardware embodiment, an entirely software embodiment, or an embodiment combining software and hardware. Furthermore, portions of the invention may be a computer program product on a computer-usable storage medium having computer readable program code on the medium. Any suitable computer-readable medium may be utilized including, but not limited to, static and dynamic storage devices, hard disks, optical storage devices, and magnetic storage devices.

Certain embodiments of the invention are described herein with reference to flowchart illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

FIG. 1 illustrates an example of a network system 10 in accordance with an aspect of the invention. The network system 10 can be a local area network (LAN) or a wide area network (WAN), such as the Internet. The network system 10 includes one or more computers 12 that are each coupled to an inter-connecting network 14. Although the computers 12 are depicted in the example of FIG. 1 as servers, the computers 12 can be configured as any combination of personal computers (PCs), workstations, enterprise-class server computers, or any of a variety of other electronic devices that can be coupled to the network 14. Those skilled in the art will understand and appreciate various types of network topologies and equipment that can be utilized to provide the network system 10.

Each of the computers 12 can be configured to execute one or more software applications 16 that can publish messages to one or more subscriber applications 16. The applications 16 can publish the messages and responses using an asynchronous message protocol. The messages can be subscribed to by one or more other software applications 16 in the network 14. In such a publish/subscribe (e.g., pub/sub) architecture, a given software application 16 may publish a message for one or more subscriber applications 16, the identity of which may or may not be known to the publishing application. Each of the subscribing applications 16 can receive the published messages that are pertinent to it, such as based on message metadata. Additionally, or alternatively, a service can be utilized for publishing messages and sending the message to an appropriate set of one or more subscribers, as is known in the art. Accordingly, messages can be transmitted between two or more software applications 16 in the network 14 based on publication of and subscription to the messages.

The network system 10 also includes a computer 18 that includes a message tracking system 20. The computer 18 can be configured as a PC, workstation, special purpose processing device, an enterprise-class server or any other device that can be programmed accordingly. The message tracking system 20 is programmed to track messages that are sent within the network 14. For example, the message tracking system 20 can receive messages that are published to the network 14, which can include all messages or a selected subset of messages that are published. As one example, an application can publish a message, such as by providing the message to an appropriate service (e.g., a post office service) programmed for publishing messages. Alternatively, the application itself can publish the message. In either case, such published message is received by the message tracking system 20, such as via an associated application programming interface (API) that specifies requisite information to the message tracking system. The message tracking system 20 thus receives the message via the API based on which the message tracking system can generate tracking information associated with each published message. The resulting tracking information can be made accessible for use by another application or by a user, such as via a computer or associated workstation at one or more of the computers 12 and 18. For instance, the user of respective one of the computers 12 and 18 can utilize the tracking information of the respective messages for planning, workflow updates, and/or troubleshooting purposes.

It will be understood that the messages can be published according to a plurality of different message protocols. As used herein, the term "protocol" is intended to encompass any convention or standard that to enable transfer or exchange of data or information between two or more computing endpoints, which endpoints may include software applications, hardware or a combination of hardware and software. For example, each of the software applications 16 can publish messages according to a specific and distinct protocol. The protocols that are supported by the network system 10 can be any of a variety of types and further can vary according to industry standards.

In the broadcast media industry, some examples of message protocols that can be utilized in the system in include the Broadcast eXchange Format (BXF), Programming Metadata Communications Protocol (PMCP—the Advanced Television Systems Committee (ATSC) Standard A/65C), Abstract Device Interface (ADI), and Video On Demand (VOD—including version 1.1 though version 2.0 of the VOD standard, which is specified by Cable Television Laboratories, Inc.). As a more specific example, the Society of Motion Picture and Television Engineers (SMPTE), according to the work of the S22-10 Committee, continues ongoing efforts to develop BXF, which is a protocol to provide for exchange of data among broadcast systems. The standards that have been developed by and are currently being developed by the S22-10 Committee of the SMPTE under document number SMPTE-2021 are incorporated herein by reference.

Various industries have developed standard protocols for a variety of purposes, which can also be utilized by a tracking system implemented according to an aspect of the invention. For example, in the automotive industry, the Automotive Aftermarket Industry Association (AAIA) has developed the Product Information Exchange Standard (PIES) which can be used for the management and exchange of a variety of product attribute information in the vehicle aftermarket industry (see, e.g., http://www.aftermarket.org/eCommerce/Pies/Pies.asp). In the news industry, the International Press Telecommunications Council (IPTC) has developed the NITF (News Industry Text Format), which utilizes XML to define the content and structure of news articles (see, e.g., http://www.nitf.org/). As a further example, the IPTC has developed the G2 family of news exchanged standards, including NewsML-G2 2.0, which is a media-type agnostic news exchange format for general news (see, e.g., http://www.iptc.org/G2-Standards/newsml-g2.php). Similarly, in the publishing and news industry, the International Digital Enterprise Alliance (IDEAlliance) has also developed and continues to develop various standards protocols, including the PROSE/XML specification (see, e.g., http://www.idealliance.org/prosexml), the PRISM 2.0 standard (see, e.g., http://www.prismstandard.org/), and XMP-Open (see, e.g., http://www.xmp-open.org/) to name a few standards made available from IDEAlliance. Those skilled in the art will understand and appreciate various other types of protocols and standards that can be utilized for tracking messages according to an aspect of the invention, including existing and yet to be developed protocols (known and proprietary).

It will be understood that the message tracking system 20 can be programmed to track the messages in a protocol agnostic manner, regardless of the protocol in which each of the messages are published. This can be accomplished by an extensible (e.g., expandable) configuration file (or files) that can store configuration information for each protocol to facilitate extraction of selected types of information for each such protocol. The configuration file(s) can be stored as an XML document, for example, although other languages and formats can be utilized for storing the configuration file for the set of registered protocols.

By way of further example, the message tracking system 20 includes a detector 22 that is programmed to extract metadata from the published messages. The metadata can include data that identifies the protocol for the message and routing information associated with the message. For instance, the API can pass the protocol as a protocol identifier outside of the message content that is also passed to the tracking system. Alternatively, or additionally, the protocol identifier can be provided by the API as part of the message content that is passed to the tracking system 20. The routing information, for example, can include direction data and message category data or the routing information can be utilized to ascertain a direction data and a category data of the message.

The detector 22 can employ the protocol to obtain a set of one or more query statements that are utilized to extract the routing information. A tracking manager 24 can assemble a flight plan that includes a sequence of sub-transactions based on the protocol and at least a portion of the routing information. The status of the sequence for the flight plan can be updated by the tracking manager 24 based on messages sent in response to the originating published message. The response messages can include replies and/or acknowledgements that refer back to or otherwise relate directly the original message associated with the flight plan. As an example, touch-points in the network system can detect responses sent by respective software applications 16 (e.g., acknowledgements, replies, or otherwise forward messages) associated with the published message being tracked. The touch points can be implemented as processes or hardware programmed to detect response messages and to inform the tracking system accordingly. A flight plan thus represents the tracking information of a given message from beginning to end of the message lifecycle, such that it defines a complete message transaction between two or more software applications 16. The flight plan can be accessed (e.g., via a graphical or text based user interface) by an authorized user via one or more of the computers 12 or 18 to track the status of the corresponding message.

It is to be understood that the network system 10 is not intended to be limited to the example of FIG. 1. For example, the network system 10 is not limited to providing asynchronous messaging between the software applications 16. For example, the software applications 16 can be configured to route each of the messages for which tracking is desired to the message tracking system 20, such that the messages can be re-routed to their intended destinations by the message tracking system 20 or by other associated processes. As another example, the software applications 16 can include hardware/firmware applications that can publish/transmit messages onto the network 14. While the example of FIG. 1 depicts software application in a plurality of computers, it is to be understood that any of the software applications 16 can be implemented in a common computer 12, which may also include the message tracking system 20. Thus, it will be understood that a publishing application and one or more subscribing application can be implemented as separate processes or methods implemented in a single computer. Accordingly, the network system 10 can be configured in any of a variety of ways.

Figure 2:
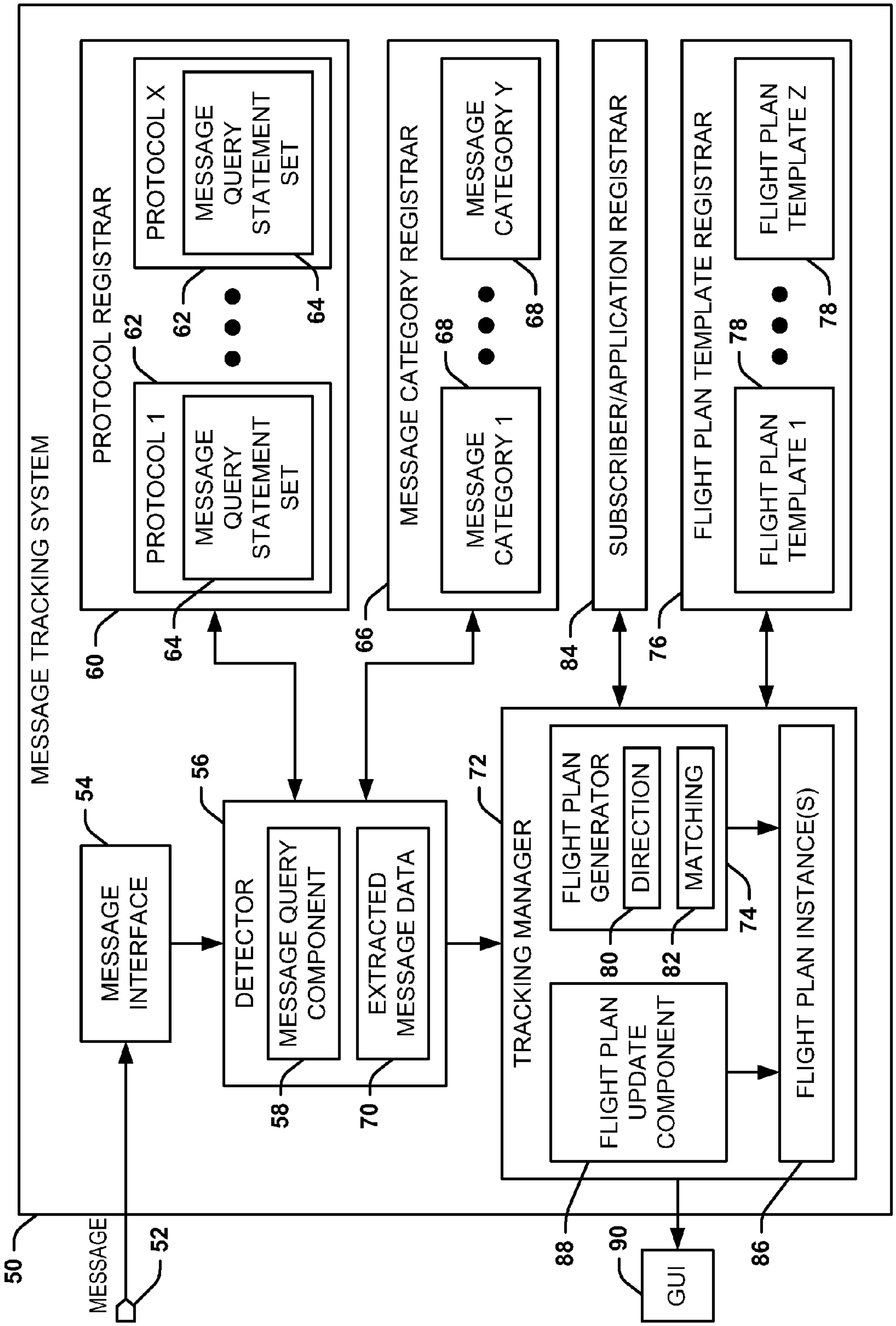
FIG. 2 illustrates an example of a message tracking system in accordance with an aspect of the invention.

FIG. 2 illustrates an example of a message tracking system 50 in accordance with an aspect of the invention. The message tracking system 50 can be implemented as software instructions implemented on computer that may be coupled to a network. Accordingly, reference can be made to the example of FIG. 1 for additional context for the message tracking system 50 in the example of FIG. 2.

The message tracking system 50 is programmed to receive a message via a message interface 54. The message interface 54 thus provides a mechanism through which the messages can be provided to the message tracking system, such as may be published from one or more of the applications or systems. As an example, the application that publishes a given message (or a service that publishes messages in response to requests from the application) provides the message to the tracking system via an API that specifies the message interface 54. The message interface 54 thus can be considered a passive listening component that monitors the network or otherwise receives messages that are published by one or more other applications.

The message tracking system 50 includes a detector 56. The detector 56 is programmed to extract message characteristic metadata from the message from the message interface 54. As an example, the detector 56 can be programmed to extract protocol information from the message provided by the message interface 54, which protocol information describes (or otherwise identifies) the protocol according to which the message has been provided. Alternatively, as described herein, the detector 56 can ascertain the protocol from information that is passed external to the message body, such as specified by an API that provides the message to the tracking system 50.

Figure 3:
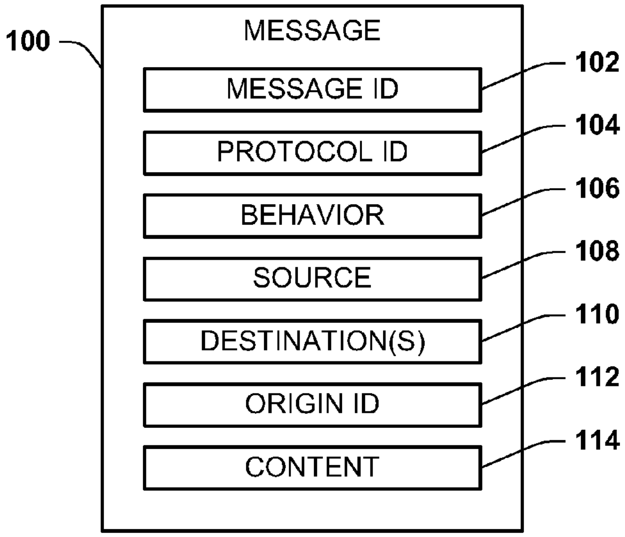
FIG. 3 illustrates an example of a message that can be implemented in accordance with an aspect of the invention.

FIG. 3 illustrates an example of a message 100 in accordance with an aspect of the invention. The message 100 can be provided according to any of a variety of different message protocols. The messages are generated and published by software applications or systems, such as described in the example of FIG. 1. As such, the message 100 can be a message that is subscribed to by the message tracking system 50 in the example of FIG. 2.

The message 100 includes a plurality of message characteristics or metadata. For example, the message 100 includes a message identifier (ID) 102, a protocol ID 104, behavior data 106, source (or origin) data 108, destinations data 110, an origin ID 112, and a content data 114. The message ID 102 can uniquely identify the message 100. The protocol ID 104 can identify which of the plurality of protocols in which the message 100 has been generated and/or published onto the network 14. The particular data requirements utilized to represent the message characteristics or metadata can vary according to the protocol with the message is provided. Some or all of the message ID 102, protocol ID 104, behavior data 106, source data 108, destination(s) data 110, and origin ID 112 can define the routing information that is extracted from the message (e.g., by the detector of FIG. 2).

The behavior data 106 can indicate the type of the message 100 or characteristics associated with the type of message, such as can describe the intent of the message that is published or based on which the intent or category of message can be ascertained. As an example, the message 100 can be a query message, a request message an informational message, an acknowledgement message, a reply message, a content message, a scheduling message, a permissions message, a proposal message, billing messages, or any of a variety of other message types that is published for a known intended purpose for subscribers of the message. As with other message characteristics, the behavior data 106 can be specific to the communications protocol with which the message was published. The source data 108 can indicate an originating software application or system that published the message 100. The destination(s) data 110 can indicate one or more subscribing software application or system for which the message is intended. The origin ID 112 can indicate an original message to which the message 100 pertains. For example, if the message 100 is an acknowledgement or a reply message, the origin ID 112 can indicate the original message to which the message 100 is acknowledging or replying. The content data 114 can include the content of the message 100 that one or more of the subscribing software applications are to receive and process. The extent and information that provides the content data 114 will vary according to the behavior or type of message. For example, the content can include instructions, a request for information, provide a playlist for a given channel or channels as well as identify include or identify program content. It is to be understood that the message 100 could include other types of characteristics or metadata as well, which can vary according to the protocol and type for the message.

Referring between FIGS. 2 and 3, the detector 56 can be programmed to employ the message query component 58 for extracting the message ID 102, the protocol ID 104, the behavior data 106, the source and destination(s) data 108 and 110, and the origin ID 112 (if applicable). For example, the detector 56 can first extract the protocol ID 104 associated with the message, such as can be passed with the message to the message interface 54 from an application or system via an appropriate API. Alternatively, or additionally, the message query component 58 can extract the protocol information from the message 100. As an example, the message query component 58 can be programmed to activate XPath statements to extract the message characteristic metadata from an XML document corresponding to the message.

The detector 56 can then employ the determined message protocol to query the message 100 for extracting other message characteristics or metadata. The detector 56 can thus be programmed to provide extracted message data 70 for a given message 100, which, as described herein, can be used to generate tracking information for such message. Additionally, when a message is determined to be a response to a published given message, the routing information can be extracted by the detector 56 for updating existing tracking information for the given message. For instance, the extracted message data can indicate that a respective message is a response that refers back to an original published message (e.g., a reply or acknowledgement message).

The detector 56 is programmed to access a protocol registrar 60 in response to determining the protocol of the message. As an example, the protocol registrar 60 can be stored in memory along with the executable components of the message tracking system 50, or can be configured in an external memory structure. The protocol registrar 60 includes one or more configuration files for a plurality of X protocols 62, where X is a positive integer denoting the number of registered protocols. As an example, the protocols 62 can be configured as one or more Extensible Markup Language (XML) document specific to a given one of the plurality of protocols that are supported by the tracking system 50. The protocol registrar is itself extensible such that it can be expanded or appended to accommodate new or different protocols without requiring any further programming of the tracking system 50.

Each of the registered protocols 62 in the protocol registrar 60 includes a set of one or more message query statements 64. As mentioned herein, the set of message query statements can be provided in a single XML document that provides the registrar or separate documents can be provided for the various registered protocols to provide the register 60. Each of the message query statement sets 64 can correspond to message query statements that are specific to the respective one of the protocols 62. For the example messages provided as XML documents, the message query statement sets 64 can include a specific set of XPath statements that can be implemented to query the message to ascertain the routing information and other message characteristics or metadata for the respective message protocol.

The protocol ID (or other protocol information) determined by the detector 56 can be provided to the protocol register to determine if the protocol for a given message has been registered such that set of message query statements 64 exists. If the protocol is registered, the appropriate message query statement set 64 is returned to the message query component 58 for extracting the routing information and other message characteristics or metadata from the message. If the detector determines that the protocol of the given message is not registered, the message can be ignored. Alternatively, or additionally, the message tracking system 50 can send an alert message (e.g., to an administrator or application) with sufficient information to inform a user (a person or an application) of the unregistered protocol, such that the protocol can be added to the register, if desired.

FIG. 4 illustrates an example of part of an XML document that can be programmed to implement a protocol registrar 120 in accordance with an aspect of the invention. In the example of FIG. 4, the protocol registrar 120 is demonstrated as a single .XML file. While the registrar demonstrates only a configuration file for a single protocol (e.g., the BXF v1 protocol), it will be appreciated that the protocol registrar defined by the XML document can include any number and different types of protocols (e.g., as represented by the ellipsis). The XML document is validated according to an XML schema, which is utilized to validate the XML document corresponding to the protocol registrar 120. In the example of FIG. 4, the XML document is expressed according to a schema named "Protocols.xsd" which is one particular schema representation. Those skilled in the art will understand and appreciate various ways to associate an XML document with a corresponding schema, which can vary according to the schema language.

In the example of FIG. 4, the protocol registrar 120 demonstrates one such protocol, designated at 122, as version 1 of BXF ("BXF v1"). Structured beneath the protocol element 122 are sub-elements and attributes, indicated at 124, which describe details regarding the protocol. In this example, the sub-elements and attribute include namespace (for defining the vocabulary for the XML document), schema path, prefix, and errorXpath (property used to return error information for invalid nodes). Also provided in the protocol registrar 120 is a message query statement set 126.

By way of further example, the message query statement set 126 includes a set of XPath statements that can be employed to query a BXF v1 message that is received at the detector for a predetermined set of information. The message query statement set 126 includes RootError, such as can be implemented to query a message to determine a routing error or failed delivery of an original message. The query statement set also includes a MessageID, such as can be implemented to query a message for the unique identifier of the message, and a ReferredMessageID, such as can be implemented to query a message for the original (or source) message to which the current message is responsive. The message query statement set 126 can also includes Origin and Destination, such as can be implemented to determine the publisher of the message and subscribers for which applications the message is intended. The query statement set 126 can also be employed to extract a CreateTime property such as can be implemented to ascertain the date and time stamp of the message. Accordingly, the message query statement set 126 can be accessed by the detector 56 (FIG. 2) and employed by the message query component 58 (FIG. 2) to interrogate a received message upon determining that the message has a version 1 BXF protocol. Those skilled in the art will understand and appreciate that the protocol registrar can and will typically include similar protocol XML documents for each of the other protocols that are supported. The set of protocols that are included by the protocol registrar 120 define the set of registered protocols for the message tracking system 50 (FIG. 2).

Referring back to FIG. 2, as described above, the message query component 58 can employ the determined protocol for a given message to select a message query statement set 64 to extract message metadata, such as including the routing information and behavior information for a given message. As an example, the behavior information can include a message category element associated with the given message. As another example, the behavior information can include information that describes the intent of the given message. As such, the detector 56 may be programmed to derive the message category of the given message based on the behavior information.

By way of further example, the detector 56 can be programmed to access a message category registrar 66. The message category registrar 66 includes a plurality Y of registered message categories 68 that each correspond to a standardized category into which the message can be classified, where Y is a positive integer denoting the number of different standard message categories utilized in the tracking system 50. As an example, the message categories 68 can each be configured as .XML files, or the message category registrar 66 can be a single .XML file that describes each of the message categories 68. As an example, the detector 56 may be programmed to determine an appropriate message category 68 from information in the message category registrar 66. For instance, the detector 56 may be programmed to ascertain and access an appropriate one of the message categories 68 to which the message 100 belongs based on the extracted message metadata. The extracted message metadata can include the routing information (e.g., the behavior information 106 and like) that is extracted from the message by the message query component 58 employing a protocol-dependent query statement set 64. Additionally, or alternatively, a message category registrar may be omitted and the detector 56 can be programmed to infer the category for the given message based on the extracted message metadata. The message registrar provides a list of categories that can be expanded (or reduced) as may be needed to accommodate a changing enterprise system.

FIG. 5 illustrates an example of an XML document that is programmed to provide a message category registrar 130 in accordance with an aspect of the invention. In the example of FIG. 5, the message category registrar 130 is demonstrated as a single XML document, such that a description of each of the available message categories 68 is included therein. The detector of the message tracking system thus can employ the extracted routing information to query the message category registrar 130 for identifying an appropriate one of a plurality of message categories. The results of the query by the detector can also include direction information for the given message. Alternatively, the direction for a given message can be determined separately, such as described herein.

By way of further example, the message category registrar 130 includes a plurality of different types of messages, each of which message types includes a plurality of message attributes that collectively describe a respective one of the message types. One particular attribute of each message type is a category attributes that identifies a respective one of a plurality of different predefined general message usage categories. Also provided in each of the message types is a direction attribute that is programmed to describe the direction for each of the message types.

In the example of FIG. 5, the message category registrar 130 includes the following types of messages: a Ping Acknowledgement message type 132, a Playlist Query message type 134, a Media Query message type 136, a Program Schedule message type 138, and a Content message type 140. It is to be understood that the message category registrar 130 can include more or fewer or different messages types form the message types demonstrated in the example of FIG. 5. Structured beneath each of the demonstrated message categories are attributes that describe predefined information regarding the message types. Examples of attributes that can be provided for each message type include: Name, Description, Category, Direction, Group, Role and Active. The attributes associated with each of the different message types 132, 134, 136, 138 and 140 can be utilized to assemble the tracking information for a given type of message or to update tracking information for an original message.

Referring back to the example of FIG. 2, the extracted metadata and associated information regarding the protocol 62, message category 68 and other pertinent metadata for a given message are collectively represented as extracted message data 70. The message data 70 can be provided by the detector 56 (or otherwise made accessible) to a tracking manager 72. The tracking manager 72 is programmed to generate the tracking information for a given original message. The tracking manager 72 is configured to generate the tracking information as a flight plan instance for the original message and to update the flight plan instance in response to additional messages sent in response to the original message.

The tracking manager 72 includes a flight plan generator 74 that is programmed to assemble the flight plan for the original message. To assemble the flight plan, the flight plan generator 74 accesses a flight plan template registrar 76. The flight plan template registrar 76 includes a plurality of Z flight plan templates 78, where Z is a positive integer denoting the number of preprogrammed templates. For example, a template can be created for each type of protocol (e.g., Z=X). Alternatively, different templates can be provided for each message category (e.g., Z=Y). Still another alternative is to provide a unique template for each category of message for each protocol (e.g., Z=X*Y). Yet another alternative is to provide a common set of templates that can be used for some of the categories and protocols, such that the number of templates is independent of the number of protocols and the message categories.

As an example, the flight plan templates 78 can be configured as .XML files that are each specific to a given combination of protocol 62, message category 68, and direction of the message. The flight plan template registrar 76 can be included in memory along with the executable components of the message tracking system 50 or, alternatively, the flight plan template registrar can be stored in an external memory structure.

As a further example, the flight plan generator 74 can include a direction component 80 that is programmed to ascertain a direction of the message based on the routing information that is included in the message data 70. The direction of the message can correspond to the handling of the message with respect to the manner in which the message is routed. As an example, the direction component can determine a direction of the message such as can be selected from a set of predefined directions. The particular nomenclature for such directions can be defined according to the type of infrastructure in which the tracking system is utilized. For the example where the tracking system resides within or is implemented as part of an enterprise platform (e.g., an automated business process), the following set of directions may be utilized: application to application, platform to application, and application to platform. As described herein, the direction can be provided as part of the message category and thus may be provided by the detector as part of the message data 70. For example, the direction component can extract the direction of the message from the message category 68 selected for a given message. Alternatively, the direction component 80 can determine a direction of the message based on the extracted message metadata, such as including the message behavior and destination(s) data (e.g., attributes 108 and 110 of the message 100, FIG. 3).

The flight plan generator 74 can query the flight plan template registrar 76 for a flight plan template 78 that is appropriate for a given originating message. For example, the flight plan generator 74 includes a matching component 82 that is configured to query the flight plan template registrar 76 to determine if a flight plan template 78 exists for the specific combination message attributes and properties for a given original message. The matching component 82 can employ the protocol, direction and message category for the given message to select a corresponding one of the flight plan templates 78. Thus, upon registering a match, the matching component 82 returns the corresponding flight plan template 78 to the flight plan generator 74.

Figure 6:
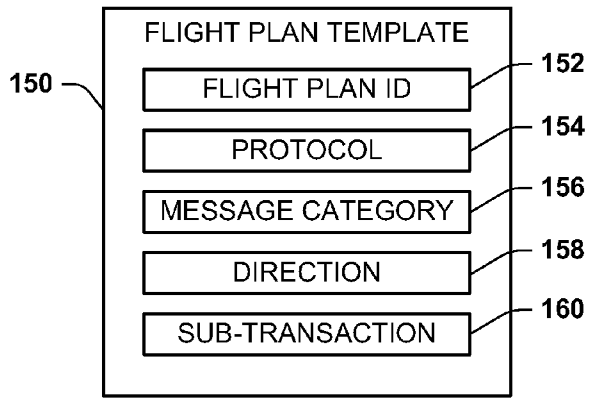
FIG. 6 illustrates an example of a flight plan template in accordance with an aspect of the invention.

As an example, FIG. 6 illustrates an example of a flight plan template 150 that can be utilized to generate flight plan instances in accordance with an aspect of the invention. The flight plan template 150 can be implemented as a schema definition programmed for constructing a valid flight plan instance. For example, the flight plan template can be implemented as an XML schema operating as a class that specifies contents of each element (structure of instance documents and data type of each element), and restrictions on content for each data element that can be part of a corresponding flight plan. The flight plan generator 74 (FIG. 2) can employ a template processor to construct a well-formed flight plan instance for a given message based on the selected template and the message data from the detector (e.g., the message data 70 as well as other relevant information derived from the message data).

By way of example, the flight plan template 150 can define a plurality of elements that can be associated with a message and the sequential steps that can correspond to a completed message transaction of the message between two or more software applications. The flight plan template 150 can define a flight plan ID element 152, such as to describe a unique identifier for the resulting instantiated flight plan. The flight plan template 150 also includes a protocol element 154, a message category element 156, and a direction element 158 that can be instantiated to describe the protocol, message usage category, and direction of the message 100 according to the source data. The flight plan template 150 can also include a sub-transaction element 160. The sub-transaction element 160 can be employed to structure each a sequential step that is to be completed in a message transaction between two or more of the software applications 16. It will be appreciated that the flight plan template 150 can include additional elements and attributes such as may be useful for describing various properties of a complete message transaction.

Referring back to the example of FIG. 2, the flight plan generator 74 can dynamically determine the number and type of sub-transactions based on the number of subscribers and connected applications, such as can be stored in a subscriber/application registrar 84. One or more instances of the sub-transaction element 160 can be provided to describe each response (e.g., acknowledgement and/or reply messages) that is subsequently provided from subscriber applications responsive to the original published message for which the flight plan is generated. Therefore, the sub-transaction element 160 can be instantiated to represent each of the sequential steps necessary for completing message transaction between the publishing application and the one or more subscriber applications.

As a further example, the flight plan generator 74 can access a subscriber/application registrar 84 to obtain information regarding each of the software applications that subscribes to each of the messages that are published to the network 14. Therefore, the flight plan generator 74 can instantiate a sub-transaction element for each of the software applications or systems that are determined to be subscribers for a given message. Accordingly, the flight plan generator is programmed to instantiate a flight plan template to provide a flight plan instance according to the message data and subscribers for each original message. The flight plan instance can be provided as an XML document that can be accessible to a user. For example, a flight plan instance implemented as an XML document can be transformed (e.g., by an Extensible Stylesheet Language Transformation (XSLT)) to provide a graphical and/or text-based user interface corresponding to the flight plan instance 86.

The preceding description is an example of the instantiation of a new flight plan based on the message 100 being a new message that is published for one or more subscribing applications or systems. However, it is to be understood that the message tracking system 50 also detects one or more subsequent message that are responsive directly to a message for which a given flight plan was already instantiated. Therefore, upon the detector 56 determining that the message refers back to a previous message, such as based on the origin ID characteristic 112, the tracking manager 72 can update one or more attributes of a respective flight plan instance 86.

The tracking manager 72 includes a flight plan update component 88. The flight plan update component 88 is programmed to update the appropriate one or more attributes of sub-transaction elements for a respective flight plan instance based on responses that are sent as part of a message transaction responsive to the original message. For instance, the update component 88 can set an attribute of the flight plan to indicate whether the corresponding sequential step of the flight plan was successfully completed or not. Specifically, the flight plan update component 88 can apply information that is extracted by the detector 56 from the subsequent responsive messages (e.g., provided as the message data 70) to update the status of sub-transaction elements of the flight plan instance 86.

After updating a last of the sub-transaction elements of the flight plan instance, or upon a failure of the active flight plan, the flight plan can be considered complete. Thus, tracking system 50 can store completed flight plan instance(s) 86, which can include successfully completed flight plans or failed flight plans to represent the tracking information for the respective messages. This flight plan information can be accessed by a user or a corresponding application such as for planning, workflow updates, and/or troubleshooting purposes. For example, the user could view the flight plans from a graphical user interface (GUI) 90, which can correspond to an XML document of one or more flight plan instance 86 or to a transformation of the XML instance to different human-readable form (e.g., another XML document, HTML document, text or the like).

Figure 7:
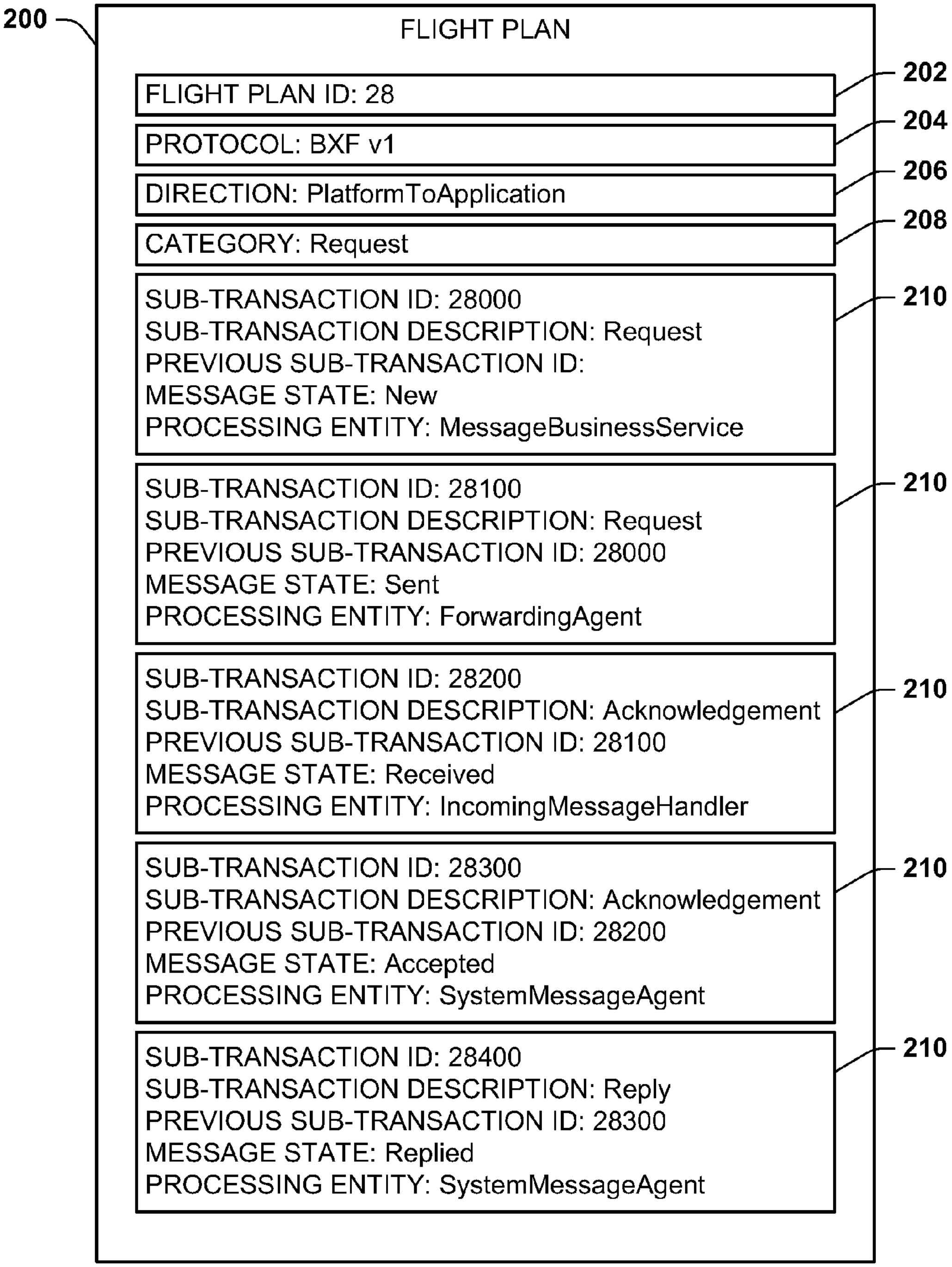
FIG. 7 illustrates an example of a flight plan in accordance with an aspect of the invention.

FIG. 7 illustrates an example of a flight plan instance 200 that can be generated in accordance with an aspect of the invention. The flight plan instance 200 includes a plurality of elements that are associated with or represent a complete transaction for a given message that has published. In the example of FIG. 7, the flight plan instance 200 includes a flight plan ID element 202 that describes a unique identifier for the flight plan 200, demonstrated as “28” in the example of FIG. 7. The flight plan 200 also includes a protocol element 204 that identifies the protocol of the message 100 that was published to generate the flight plan 200. In the example of FIG. 7, the protocol is demonstrated as version 1 of the BXF protocol, although other protocols, such as described herein, could be utilized. The flight plan 200 also includes a direction element 206, which is demonstrated as PlatformToApplication. As an example, the PlatformToApplication direction indicated in the direction element 206 may be a result of the routing information extracted from the message or can be derived by the direction component of the flight plan generator based on the extracted routing information. The flight plan instance 200 also includes a category element 208 that describes the message usage category of the originating published message.

By way of example, to generate the flight plan instance 200, the detector 56 first determines the protocol of the message, and accesses the protocol 62 and the message query statement set corresponding to the determined type of protocol (e.g., BXF v1 protocol). The message query component 58 interrogates the published message to determine the behavior and the routing information of the message 100. Based on the protocol, the behavior and routing information, the detector 56 determines a corresponding message category 68, such as provided in the message category registrar 66. The flight plan generator 74 employs the resulting set of message data 70 to determine the direction of the message (e.g., as described in the matching message category 68 or as determined based on the routing information). The flight plan generator 74 queries the flight plan template registrar 76 to determine if a flight plan template 78 matches the message characteristics, such as including the protocol (e.g., BXF v1), message usage category (e.g., request) and direction (e.g., platform to application) for the given message. In FIG. 7, the message usage category 208 for the flight plan instance 200 is a “request.”

The flight plan instance 200 of FIG. 7 includes five sub-transactions 210. Each of the sub-transactions 210 includes a common set of elements or attributes; namely, SUB-TRANSACTION ID, SUB-TRANSACTION DESCRIPTION, PREVIOUS SUB-TRANSACTION ID, MESSAGE STATE, and PROCESSING ENTITY. It will be appreciated that each of the sub-transaction elements need not be the same for every flight plan instance. The SUB-TRANSACTION ID element describes the sequence of the sub-transactions, which can be associated with the MESSAGE IDs of the message for which the flight plan instance 200 was generated and subsequent messages (e.g., from subscribers) that are associated with the complete message transaction between the originating application and one or more subscribing applications. It will be understood that the particular set of sub-transactions for a flight plan instance can vary depending on the protocol of the originating message as well as the message usage category and the direction.

The SUB-TRANSACTION DESCRIPTION element can represent a message behavior of the message that is associated with the respective sub-transaction 210. For example, the SUB-TRANSACTION DESCRIPTION of SUB-TRANSACTION ID 28000 is the same as the behavior of the flight plan 200 based on the SUB-TRANSACTION ID 28000 being associated with the message 100 that initiated the flight plan 200. The PREVIOUS SUB-TRANSACTION ID element corresponds to a reference to the prior sub-transaction in the sequence. The MESSAGE STATE element corresponds to a status of the respective sub-transaction, which is be updated by the flight plan update component 88 (FIG. 2) in response to the message tracking system 50 determining a change in status for the corresponding sub-transaction, such as by subscribing to the respective messages having the SUB-TRANSACTION ID. The PROCESSING ENTITY element can identify the computer 12 or 18, or other associated network node, which corresponds to the source (i.e., publisher) of the respective message of the SUB-TRANSACTION ID in the message transaction, such that the processing entity operates as a touch-point for the message transaction represented by the flight plan 200. Any process or application through which messages can pass can operate as touch points that are programmed to inform the message tracking system of the status of a respective message sub-transaction.

The flight plan instance 200 thus can be accessed and viewed by a user or implemented by one or more of the computer devices, such as for planning, workflow updates, workflow initiation, and/or troubleshooting purposes. It is to be understood that the flight plan instance 200 is but one example of a flight plan, such as can be generated for business process associated with the broadcast media industry, and that any of a variety of flight plan instances can be generated for the broadcast media industry as well as for other industries according to an aspect of the invention. For example, a given flight plan instance could include additional elements associated with the originating message, such as can vary depending on different protocols and/or behaviors, and could include a greater or fewer number of sub-transactions 210 than demonstrated in FIG. 7. The particular message categories and protocols and other attributes of a flight plan instance can vary according to the industry or application requirements and the related behavior of the messages. Furthermore, the flight plan instance 200 can be presented in a variety of different ways, such as in a XML, HTML or text document, which representation can also vary according to application requirements.

FIG. 8 illustrates an example an XML document that is programmed as a flight plan instance 220 in accordance with an aspect of the invention. In particular, the flight plan instance 220 in FIG. 8 is demonstrated as an XML document corresponding to the flight plan instance 200 shown and described with respect to the example of FIG. 7. Thus, the flight plan instance 220 includes a flight plan ID element 222, a protocol element 224, a direction element 226, a category element 228, and sub-transaction elements 230, demonstrated as a structured sequence in the example of FIG. 8. Those skilled in the art will understand and appreciate various other types of representations and forms that can be utilized to provide a given flight plan instance.

Referring back to the example of FIG. 2, the set of protocols 62 can be extensible (e.g., expandable). As a result, the message tracking system 50 can comprise software that is protocol independent in generating the tracking information for each message to which the message tracking system 50 subscribes. For instance, the software that is implemented by the message interface 54, the detector 56, and the tracking manager 72 can be standardized across all of the protocols that are supported by an enterprise network system in which the tracking system 50 operates. Furthermore, because of the modularity of the protocols 62, the message categories 68, and the flight plan templates 78, additional protocols can be added to and supported by the tracking system 50, such as by adding new corresponding protocols 62 and corresponding message query statement sets 64 for each additional protocol. Additionally, new flight plan templates 78 can be added, if necessary, to the flight plan template registrar to accommodate new protocols, which may have different message behaviors. For example, in the above described example of FIG. 4, additional protocols can be appended to the XML document that defines the protocol registrar 60 of FIG. 2. Accordingly, the core software code that forms the message tracking system 50 need not be reprogrammed or otherwise modified as new protocols are added to the tracking system.

It is to be understood that the message tracking system 50 is not intended to be limited to the example of FIG. 2. As an example, the components of the message tracking system 50 could be implemented as separate processes, which could be distributed across multiple devices on a given enterprise. Those skilled in the art will understand and appreciate that the message tracking system 50 can be configured in any of a variety of ways based on the teachings contained herein.

Figure 9:
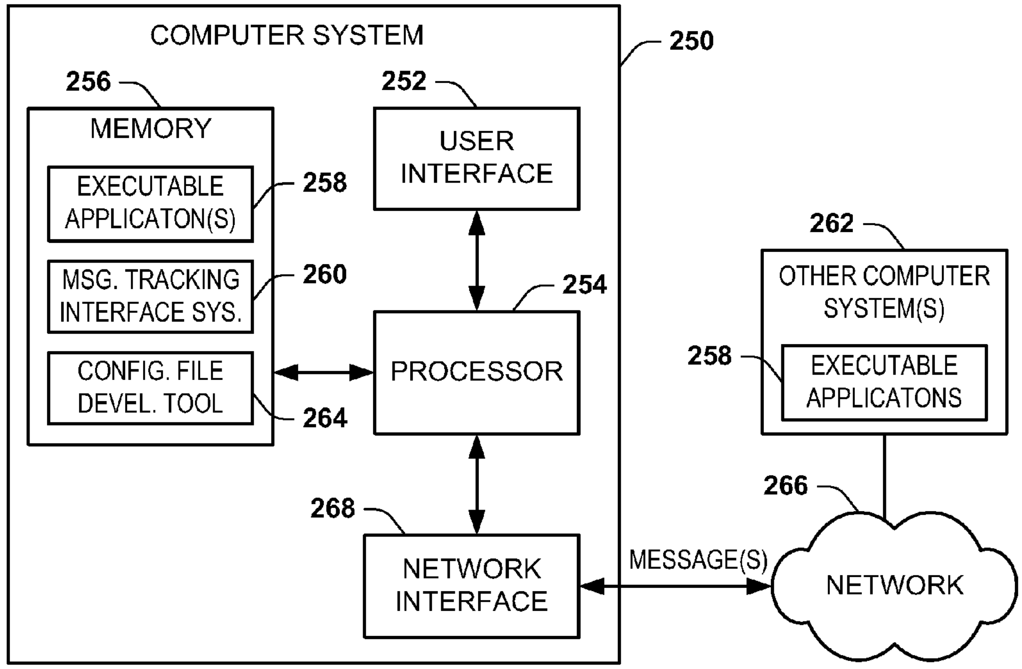
FIG. 9 illustrates an example of a computer system that can be programmed to track messages in accordance with an aspect of the invention.

FIG. 9 illustrates an example of a computer system 250 that can implement a message tracking system in accordance with an aspect of the invention. The computer system 250, for example, can be configured substantially similar to the computer 18 in the example of FIG. 1. For example, the computer system 250 can be configured as a server, PC or workstation, such as could be programmed to track messages that are published onto the network 14 in a manner described herein.

The computer system 250 includes a user interface 252. The user interface 252 can include a man-machine interface or input/output (I/O) devices, such as including a monitor, a keyboard, and a mouse. Therefore, the user can interact with the computer system 250 by providing inputs to and receiving output data via the user interface 252. The computer system 250 also includes one or more processors 254, which could be a central processing unit (CPU) for the computer system 250. The processor 254 is demonstrated in the example of FIG. 9 as being coupled to each other component of the computer system 250, which can be implemented by one or more buses or other internal connections with in the computer system. The computer system 250 also includes memory 256 that stores executable applications 258 and data. The memory 256 can include any combination read-only memory (ROM), random access memory (RAM) as well as any other form of memory structure (e.g., flash memory, a hard disk drive or the like), which may be located within a common chassis or distributed in one or more other devices to which the computer system 250 is connected. In addition to storing executable instructions, the memory 256 can store data that is used by the applications and processes running thereon.

The memory 256 can include any number of executable applications (or systems) 258 that operate within the enterprise. Applications running in the computer system 250 are executable by the processor 254. For example, the executable applications 258 can include one or more software enterprise systems programmed to provide desired functionality within an enterprise system. For the example of the broadcast industry, the applications 258 can include broadcast specific business processes, such as including one or more of the following: a traffic system, an accounting and billing system, media management system, an inventory management system, as well as playout and automation systems. Various commercially available broadcast-industry-related products are commercially available from Harris Corporation of Melbourne, Fla. and its affiliates as well as from other vendors. Additionally or alternatively, one or more (e.g., all or most) of the executable applications 258 can be implemented remotely, such as on a one or more other computer system 262 that is in communication with the computer system 250, such as via a network 266. The applications running on the computer system 250 can communicate with applications or systems running on the other computer system(s) 262 via a network interface 268.

The memory 256 can also include a message tracking system 260, such as is programmed to perform the functionality shown and described herein (see, e.g., FIG. 2 and its corresponding description). As an example, the message tracking system 260 can be programmed to subscribe to messages that are published within an enterprise network via a network interface 262 that connects the computer system 250 to the network 14. For instance, a publishing service can pass the messages to the tracking system 260 via an API. Thus, the message tracking system 260 can extract message characteristic and metadata from messages and instantiate a selected flight plan template for tracking the lifecycle of the published messages. The tracking information (e.g., a flight plan instance) can be accessed by a user via the user interface 252, such as at the computer system 250 or remotely at a different computer.

The computer system 250 can include a configuration file development tool 264. The configuration file development tool 264 can be configured as an executable application or process (stored in the memory 256) that can be utilized to replace, append or modify one or more of the protocol configuration files, message categories configuration files, the flight plan template files. For example, a user (or another application) can employ the configuration file development tool 264 to add a protocol to the protocol configuration file (e.g., an XML document). After adding the one or more new protocols, a user could employ the configuration file development tool 264 to modify the message categories configuration files, and flight plan template configuration files to support the newly added protocol(s) via the configuration file development tool 264, such as based on a GUI associated with the user interface 252. Alternatively, updates to the configuration files can be provided automatically (e.g., by a web service or other application) to accommodate new protocols that may be made available by a manufacturer or a developer or a as published by a standards body. It will be appreciated that the message tracking system 260 need not be changed or reprogrammed with protocol-specific software to enable the system to handle the addition of new protocols. Instead, the protocol information need only added to a selected subset of one or more configuration files (e.g., the protocol registrar). Since the configuration files can be implemented as an XML document according to a predefined schema, the modifications can be performed by an authorized user without requiring changes to the executable instructions that provide tracking system functionality. Those skilled in the art will understand appreciate that the configuration files and other documents and files can be represented in different languages and forms currently known and yet to be developed ways that such information can be represented.

It is to be understood that the computer system 250 is not intended to be limited to the example of FIG. 9. For example, the computer system 250 is demonstrated simplistically, such that the computer system 250 can include any of a variety of additional components not demonstrated in the example of FIG. 9. In addition, one or more of the components of the computer system 250 can be distributed across the network system 10, such that one or more of the components of the computer system 250 can reside on any number of one or more other computer devices or systems.

Figure 10:
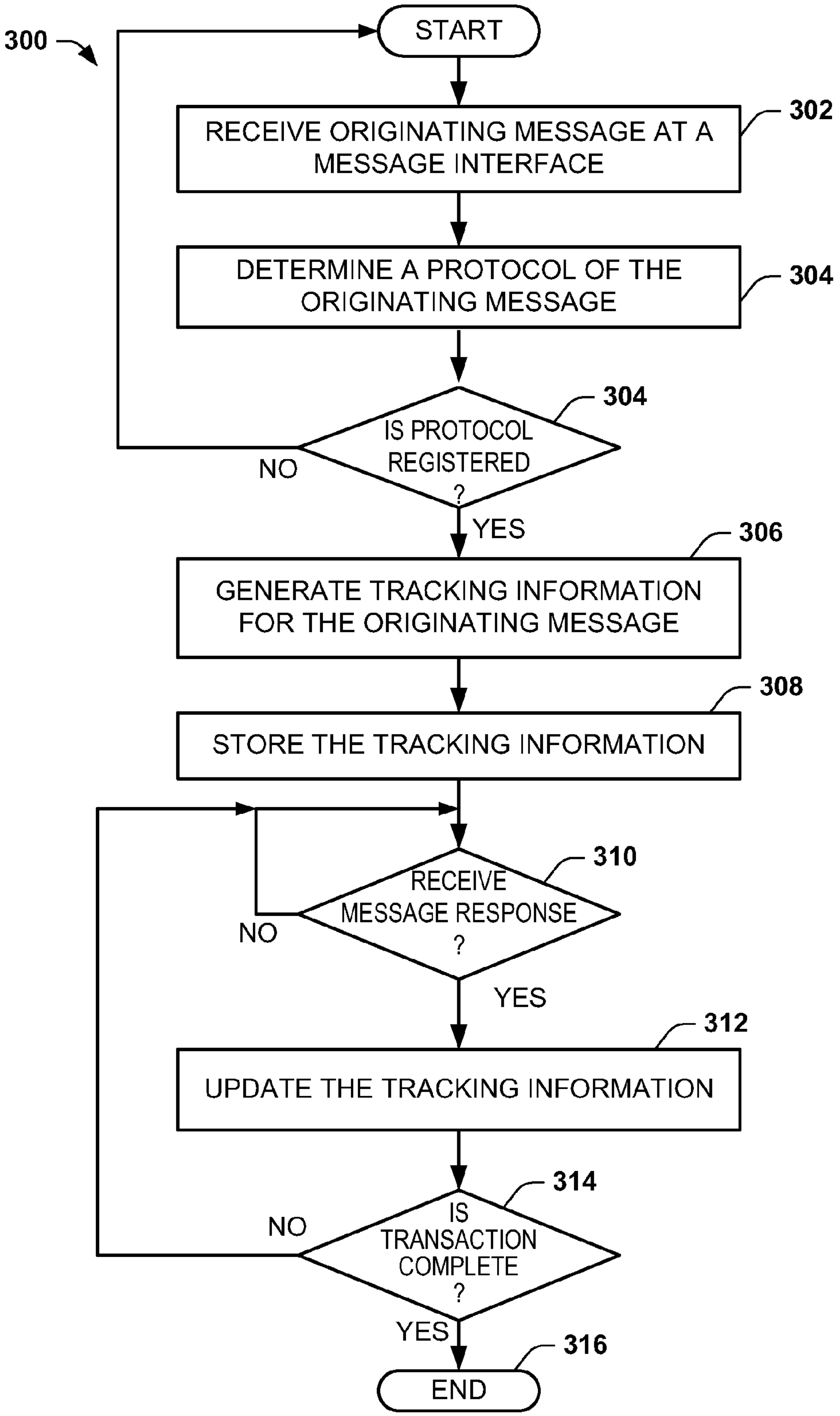
FIG. 10 illustrates an example of a method for tracking messages in accordance with an aspect of the invention.

In view of the structural and functional features described above, certain methods will be better appreciated with reference to FIG. 10. It is to be understood and appreciated that the illustrated actions, in other embodiments, may occur in different orders or concurrently with other actions. Moreover, not all features illustrated in FIG. 10 may be required to implement a method according to the subject invention. It is to be further understood that the following methodology can be implemented in hardware (e.g., one or more processors, such as in a computer or computers), software (e.g., stored in a computer readable medium or as executable instructions running on one or more processors), or as a combination of hardware and software.

FIG. 10 illustrates an example of a method 300 for tracking messages in accordance with an aspect of the invention. After the method 300 has been activated, such as including initializing variables and loading appropriate data classes and schemas, the method proceeds to 302 to begin the core message tracking process. At 302, an originating message that has been published by a first application is received at a message tracking interface. The originating application can be one of several software applications that are distributed across an enterprise network. The publication can be sent from the application or by a publication service running on the enterprise network. The enterprise can include any combination of hardware or software that is communication with each other, including via a LAN, a WAN (e.g., including the Internet) or communicate over an internal bus structure within a computer on which the method 300 is running. At 304, a protocol according to which the first message has been configured is determined. The protocol can be determined based on information passed to the method via an appropriate API and/or such information can be extracted from the message that is passed to the message tracking method 300. The protocol can be one of a variety of protocols. For the example of using the message tracking method 300 for use in the broadcast media industry, the protocol can include (but is not limited to) BXF, PMCP, ADI, and VOD protocols. Those skilled in the art will understand that the method 300 is applicable to other industries than the broadcast industry which may utilize any combination of publicly available and proprietary message protocols.

At 306, a determination is made as to whether the protocol is a registered protocol. If the protocol is not registered with the method 300, the method can return to 302 to receive additional messages. If the protocol is determined to be a registered protocol, the method proceeds to 308. At 308, tracking information associated with the originating message is generated based (at least in part) on the determined protocol (at 304). For example, message characteristic or metadata can be extracted from the message based on activating query statements to query each message that is provided according to a registered protocol. The message characteristics can include message ID, and/or routing characteristics (i.e., message behavior, publisher and subscribing destination(s)). The tracking information can be generated as a flight plan based on the extracted characteristics of the message. The flight plan can be generated by instantiating a flight plan template, which can be selected based on the protocol, message category, and routing direction information. At 310, the tracking information is stored onto a computer readable medium, such as RAM or other memory device. The computer readable medium can be memory that can be accessed by a user or the system, such as from a GUI that is associated with the method and programmed to provide a text and/or graphic based display corresponding to the flight plan instance.

At 312, a determination is made as to whether a related message that is responsive to the first message is received. The method can loop at 312 until all expected response messages have been received. If an expected response is not received, the determination at 312 can wait for a time-out period (if no messages are received within an expected time period) and then return an error. Then at least one response message can be an acknowledgement or a reply, and can reference the originating message in metadata for the message. If a response message is received, the method proceeds to 314. At 314, the tracking information is updated based on the response message that is received. The updating at 314 can be performed by a flight plan update component of the method that is programmed to update the status or other information for each of a plurality of sub-transaction steps based on metadata in each of the expected response messages. The sub-transaction steps of a flight plan can collectively represent a complete message transaction between the originating application and the subscribing applications.

At 316 a determination is made as to whether the transaction associated with the originating message has completed. If the transaction is not yet complete (e.g., additional responses or other related messages are still expected), the method can return to 312 to repeat the process at 312-316. If it is determined that the transaction has completed, the method can end at 318. If the message has ended, the stored tracking information, including all updates as provided at 314 can be made available for planning, workflow updates, troubleshooting or other purposes.

What have been described above are examples and embodiments of the invention. It is, of course, not possible to describe every conceivable combination of components or methodologies for purposes of describing the invention, but one of ordinary skill in the art will recognize that many further combinations and permutations of the present invention are possible. Accordingly, the invention is intended to embrace all such alterations, modifications and variations that fall within the scope of the appended claims. In the claims, unless otherwise indicated, the article "a" is to refer to "one or more than one."

What is claimed is:

1. A message tracking system including a server with a processor and a memory, comprising:

a message agent programmed to detect messages transmitted from one application to at least one other application;

a detector programmed to determine a protocol that is associated with a given message of the messages detected by the message agent and to select a message query statement set according to the protocol to determine message data including at least a message category for the given message, the category comprises one of a plurality of message usage categories that defines the type of the given message ascertained from the message data, wherein the plurality of message usage categories comprise a request and response;

a tracking manager programmed to generate tracking information for the given message based on the protocol determined by the detector and to store the tracking information in memory;

a flight plan generator programmed to generate a flight plan instance for the given message based on the protocol and the message category for the given message, the flight plan instance corresponding to the tracking information for the given message; and a protocol registrar that comprises protocol registration data that identifies a set of registered protocols, the protocol registration data comprising message query data to provide a query statement set for each of the registered protocols, the detector being configured to employ the message query data to extract the metadata from the messages if the protocol for the given message is registered.

2. The system of claim 1, wherein the detector is programmed to employ the message query statement to extract metadata from each of the messages, the extracted metadata comprising at least a protocol identifier for the given message, the tracking manager providing the tracking information for the given message based on the at least the protocol identifier of the extracted metadata.

3. The system of claim 2, wherein the extracted metadata also comprises at least one of the message category and the routing direction for the given message, the flight plan instance for the given message being generated based on the extracted metadata that defines the protocol and the at least one of the message category and the routing direction for the given message.

4. The system of claim 3, further comprising a flight plan template registrar programmed to store a plurality of flight plan templates, the flight plan generator being programmed to instantiate a selected one of the plurality of flight plan templates according to at least one of the protocol, the message category, and the routing direction associated with the given message.

5. The system of claim 4, wherein each of the flight plan templates is programmed to represent a sequence of steps for a complete message transaction that vary according to at least one of the protocol, the message category, and the routing direction of a respective message.

6. The system of claim 3, wherein the flight plan instance generated for the given message further comprises a data structure that includes a sequence of sub-transaction fields associated with the given message, the sequence of sub-transaction fields characterizing a set of related message transactions responsive to the given message for which the flight plan instance has been generated.

7. The system of claim 6, wherein the sequence of sub-transactions in the flight plan instance further comprises data fields indicating message characteristics selected from a set comprising: a transfer of the given message from the one application to the at least one other application, a receipt of the given message by the at least one other application, and a transfer of at least one of an acknowledgement and a reply by the at least one other application to the one application.

8. The system of claim 3, wherein the flight plan instance generated for the given message further comprises a message identifier that is set to uniquely identify a set of related messages that are transmitted in response to and directly related to the given message.

9. The system of claim 6, wherein the tracking manager further comprises an update component programmed to update a status of each of the sub-transaction fields of the flight plan instance generated for the given message based on each of the set of related message transactions that is detected by the message agent.

10. The system of claim 1, wherein the one application is configured to publish the messages onto an associated network for the at least one other application to subscribe to the messages, the tracking information for the given message being associated with publication of and subscription to messages that are responsive to the given message that collectively characterize a complete message transaction between the one application and the at least one other application.

11. A network system comprising the message tracking system of claim 1, the network system being configured to support a plurality of protocols, the plurality of protocols comprising at least one version of Broadcast Exchange Format (BXF).

12. The system of claim 1, the message tracking system being further configured to providing an alert message if the protocol for the given message is unregistered.

13. A message tracking system including a server with a processor and a memory, comprising:

a message agent programmed to detect messages transmitted from one application to at least one other application;

a detector programmed to determine a protocol that is associated with a given message of the messages detected by the message agent and to select a message query statement set according to the protocol to determine message data including at least a message category for the given message, the category comprises one of a plurality of message usage categories that defines the type of the given message ascertained from the message data;

a tracking manager programmed to generate tracking information for the given message based on the protocol determined by the detector and to store the tracking information in memory;

a flight plan generator programmed to generate a flight plan instance for the given message based on the protocol and the message category for the given message, the flight plan instance corresponding to the tracking information for the given message; and a protocol registrar that comprises protocol registration data that identifies a set of registered protocols, the protocol registration data comprising message query data to provide a message query statement set for each of the registered protocols, the detector employing the message query data to extract metadata from the given message if the protocol for the given message is registered.

14. The system of claim 13, wherein the metadata comprises a behavior associated with the given message, the system further comprising a message category registrar that comprises message category registration data that corresponds to a set of registered message categories, the detector being programmed to determine the message category for the given message based on a comparison of the behavior associated with the given message relative to the message category registration data.

15. The system of claim 14, wherein the flight plan generator is programmed to select one of a plurality of pre-programmed flight plan templates based on the protocol, the message category, and the routing direction of the given message, the selected one of the plurality of pre-programmed flight plan templates being instantiated for the given message to define the flight plan instance.

16. The system of claim 15, wherein the flight plan instance further comprises message transaction information defined for each of the at least one other application that is associated with the given message and an application that initiated the given message, the at least one other application being dynamically determined based at least in part on subscription information.

17. A method for tracking messages, the method comprising:

receiving a first message that has been published by a first application at a message tracking system, wherein an identity of at least one subscriber to the first message is unknown to the first application, and the identity of the at least one subscriber is not identified in the first message;

determining a protocol according to which the first message is configured based on protocol registration data that identifies a set of registered protocols, the protocol registration data comprising message query data to provide a query statement set for each of the registered protocols;

employing the message query data for to extract the metadata from the messages if the protocol for the first message is registered;

generating tracking information associated with the first message based on the determined protocol and the extracted metadata;

storing the tracking information onto a computer readable medium;

receiving at least one related message that is responsive to the first message at the message tracking system; and updating the tracking information based on the at least one related message;

wherein generating the tracking information comprises generating a flight plan based on the determined protocol and at least one of routing data and message category data of the first message.

18. The method of claim 17, further comprising:

extracting message identification (ID) data and original message ID data from the at least one related message; and correlating the at least one related message as being responsive to the first message based on the extracted message ID data and the original message ID data.

19. The method of claim 17, wherein updating the tracking information comprises updating each of a sequence of sub-transaction steps that collectively define a complete message transaction.

20. The method of claim 17, further comprising extracting at least one of the routing data and the message category data from the first message in response to detecting that the determined protocol is a registered protocol.

21. The method of claim 20, further comprising:

determining direction data for the first message based on the routing data;

selecting a flight plan template according to the determined protocol and the at least one of the direction data and the message category data; and instantiating the selected flight plan template to define an instance of the flight plan.

22. The method of claim 20, wherein extracting the at least one of the routing data and the message category data comprises extracting origin data, destination data, and message behavior data from the first message, the method further comprising:

ascertaining routing destination data associated with the first message based on the origin data and the destination data; and ascertaining message category data based on the message behavior data.

23. The method of claim 20, further comprising:

accessing message query data associated with the determined protocol; and querying the first message based on the message query data to extract the at least one of the routing data and the message category data from the first message.

24. The method of claim 23, wherein accessing message query data comprises accessing a plurality of predefined statements associated with the determined protocol, and wherein querying the first message comprises interrogating the first message with the predefined statements to ascertain the at least one of the routing data and the message category data.

25. A system including a server with a processor and a memory, comprising:

a publishing application programmed to publish messages within a network;

at least one subscribing application configured to subscribe to the messages published within the network, wherein an identity of the at least one subscribing application is unknown the publishing application, and the identity of the at least one subscribing application is not identified in the messages published within the network;

a detector programmed to determine a protocol associated with a given one of the messages based on protocol registration data that identifies a set of registered protocols, the protocol registration data comprising message query data to provide a query statement set for each of the registered protocols, the detector to employ the message query data to extract the metadata from the given one of messages if the protocol for the given message is registered;

a tracking manager programmed to generate tracking information for the given one of the messages based on the determined protocol; and a graphical user interface (GUI) for providing user access to the tracking information;

wherein the tracking manager comprises a flight plan generator configured to generate a flight plan instance that defines the tracking information for the given one of the messages based on the protocol associated with the given one of the messages and based on message behavior information and routing information of the given one of the messages.

26. The system of claim 25, wherein the detector further comprises a message query component programmed to extract at least the message behavior information and the routing information from the messages sent within the network.

27. The system of claim 26, wherein the flight plan instance representing a complete transaction for the given one of the messages as a sequence of sub-transactions associated with the given one of the messages.

28. The system of claim 26, further comprising a protocol registrar programmed to store at least one configuration file that includes query statements programmed to extract selected information from messages published according to each of a plurality of protocols, the message query component being further configured to interrogate the messages published in the network based on the configuration files for extracting the message behavior information and the routing information associated with such messages.

29. The system of claim 26, further comprising a flight plan template registrar programmed to store a plurality of flight plan templates, the flight plan generator being further programmed to instantiate a selected flight plan template from the flight plan template registrar to define the flight plan instance for the given one of the messages, the flight plan generator selecting the selected flight template based on the protocol, the message behavior information, and the routing information associated with the given one of the messages.

* * * * *